United States Patent
Huang

(10) Patent No.: US 8,582,141 B2
(45) Date of Patent: Nov. 12, 2013

(54) AVOIDING DEADLOCK IN NETWORK PRINTING

(75) Inventor: Hung Khei Huang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 11/960,399

(22) Filed: Dec. 19, 2007

(65) Prior Publication Data

US 2009/0161144 A1 Jun. 25, 2009

(51) Int. Cl.
*G06F 15/00* (2006.01)

(52) U.S. Cl.
USPC ........... 358/1.15; 358/1.14; 358/3.2; 709/224

(58) Field of Classification Search
USPC ................. 358/1.14, 1.15, 3.28, 540; 709/224
See application file for complete search history.

(56) References Cited

U.S. PATENT DOCUMENTS

| | | | |
|---|---|---|---|
| 5,050,104 A | | 9/1991 | Heyen et al. |
| 5,544,318 A | * | 8/1996 | Schmitz et al. ............... 709/207 |
| 5,812,768 A | * | 9/1998 | Page et al. ...................... 709/228 |
| 5,970,228 A | * | 10/1999 | Nezu ................................ 726/34 |
| 6,665,811 B1 | | 12/2003 | de Azevedo et al. |
| 6,920,637 B2 | * | 7/2005 | Mason et al. ................... 719/318 |
| 7,230,731 B2 | * | 6/2007 | Dan et al. ...................... 358/1.14 |
| 7,248,384 B2 | | 7/2007 | Parrish et al. |
| 7,310,670 B1 | * | 12/2007 | Walbeck et al. .............. 709/225 |
| 2005/0024664 A1 | * | 2/2005 | Schmidt ........................ 358/1.13 |
| 2005/0050013 A1 | | 3/2005 | Ferlitsch |
| 2005/0210129 A1 | * | 9/2005 | Feng et al. .................... 709/224 |
| 2006/0001908 A1 | | 1/2006 | Ohta |
| 2006/0271676 A1 | | 11/2006 | Talayco et al. |
| 2007/0022198 A1 | | 1/2007 | Messer et al. |
| 2007/0024888 A1 | * | 2/2007 | Bailey et al. ................. 358/1.14 |

\* cited by examiner

*Primary Examiner* — Allen H Nguyen
(74) *Attorney, Agent, or Firm* — Canon USA Inc. IP Division

(57) ABSTRACT

A method and apparatus for printing over a network where a user at a client device is able to print to a network printer via a server device. The server device includes a print driver that initializes an asynchronous communication channel, sends notification message data to a client device over a network via the asynchronous communication channel, receives data from the client device in response to delivery of the notification message data, and requests user input data from the client device for printing.

9 Claims, 5 Drawing Sheets

AVOIDING DEADLOCK IN NETWORK PRINTING

BACKGROUND OF THE INVENTION

1. Field of the Invention

The present invention relates to avoiding deadlock when printing over a network and, more specifically, a method for checking client connection status over a network.

2. Description of the Related Art

With the growing presence of computer users connected to a network, there has been an increasing need to provide network-printing solutions to these users. Many of the solutions available require a remote server to manage the network-printing functions such as rendering print data and printing itself. Because of this, the need arises for communication means allowing the remote server to communicate with the client device and the client user.

To handle this problem, companies such as Microsoft™ have introduced asynchronous user interfaces into their operating systems. These interfaces allow printer drivers on remote servers to send message boxes to a user's session at a client device over the network. Messages can include notifications and custom message boxes prompting users for information needed at the remote server. Although this provides a solution for communication, problems with this approach arise when the remote server requires input from the client device user for printing.

In these situations, client users may connect to the remote printer through the remote server under different credentials than those used for their current session at the client device. This causes messages sent from the printer driver to the client device to be lost because the print driver sends messages based on the identification information used by the client user to connect to the remote printer. Since the credentials are different from their session on the network, the messages never reach the users at the client computers. The non-delivery of messages halts printing because the server cannot send requests for necessary user information. This results in stoppage of the printer queue sequence and printing at the remote printer all together.

SUMMARY OF THE INVENTION

To solve the aforementioned problems, one aspect of the present invention is to provide a method for checking client connection status over a network. To accomplish this aspect, the present invention provides a method for printing over a network including initializing an asynchronous communication channel, sending notification message data, based on user session data, to a client device over a network via the asynchronous communication channel, receiving data from the client device in response to delivery of the notification message data, and requesting user input data from the client device, wherein the user input data is processed to begin printing.

Further features of the present invention will become apparent from the following description of exemplary embodiments (with reference to the attached drawings).

DESCRIPTION OF THE EMBODIMENTS

Exemplary embodiments of the present invention provide for printing over a network. Pursuant to these exemplary embodiments, a user at a network connected client device can print a document at a remote printer via a remote print server.

More specifically, according to an embodiment of the invention, a user prints at a client device to a remote printer over a network via a print server that checks client connection status before prompting the client user for information to print.

Figure 1:
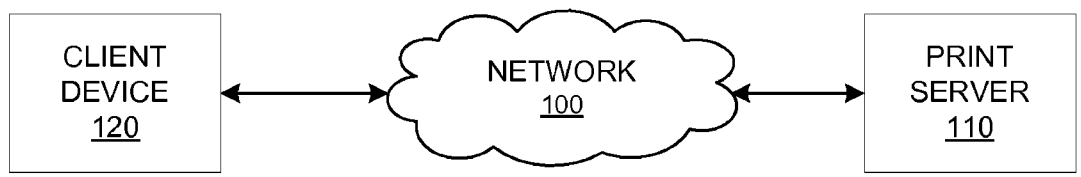
FIG. 1 is a block diagram illustrating a system for checking client connection status and requesting client user input over a network according to an exemplary embodiment of the present invention.

FIG. 1 is a block diagram illustrating a system for checking client connection status and requesting client user input over a network according to an exemplary embodiment of the present invention. The system according to the present embodiment includes a client device 120, a network 100, and a print server 110.

The network 100 can be any network allowing transport of data between devices communicatively coupled to the network 100. In general, data can take the form of, but is not limited to, documents, digital photos, and digital media files. The network 100 can be private or public, wired or wireless, in whole or in part.

The print server 110 can be any computer system or equivalent that provides services to other computing systems over a network. Generally, the print server 110 provides storage of print jobs and support for printing to a network printer. Additionally, the print server 110 has an asynchronous user interface mechanism that allows a print driver to send and receive notification messages to a client device 120 communicatively coupled to the network 100, independent of a spooler. In the present embodiment, before printing is started, the print server 110 checks connection status of the client device 120 to confirm the connection and requests information from the client device upon confirmation.

The client device 120 can be, but is not limited to, a personal computer, a digital lifestyle device, television, or digital reading/display device that is communicatively coupled to the network 100. In general, a user employs the client device 120 to print a document at a remote printer over the network 100. The user does so by initiating a print application that sends print data to the print server 110 over the network 100.

While the present invention describes a single server and a single client communicatively connected to the network 100, a plurality of clients and a plurality of servers can be communicatively coupled to the network 100.

Figure 2:
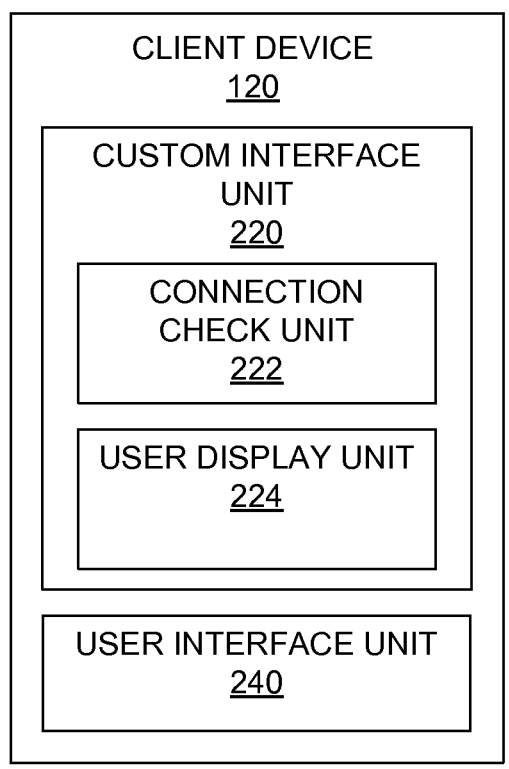
FIG. 2 is a block diagram of a client device configured to print according to an exemplary embodiment of the present invention.

FIG. 2 is a block diagram of a client device 120 configured to print according to the present embodiment. The client device 120 includes, but is not limited to, a custom interface unit 220 and a user interface unit 240.

The user interface unit 240 can be any device and/or program, or combination thereof, which allows viewing and management of files, folders, and/or drives on the client device 120. In general, the user interface unit 240 is associated with the operating system of the client device 120 and it presents a user with a graphical interface to control the client device 120. In the present embodiment of the invention, the user interface unit 240 is Microsoft™ Windows Explorer™ and it receives notification messages to invoke the custom interface unit 220. However, any other device/program, etc. that would enable practice of the present invention is applicable.

The custom interface unit 220 can be any device and/or program, or combination thereof, which allows the client device 120 to execute commands, functions and/or applications. Generally, the custom interface unit 220 is installed on the client device 120 when a printer is added to a list of available printers at the client device 120. In addition, the user interface unit 240 invokes the custom interface unit 220 when necessary to perform a specific function.

The custom interface unit 220 includes, but is not limited to, a connection check unit 222 and a user display unit 224. Generally, the user interface unit 240 receives notification message data invoking the custom interface unit 220 to execute a service, function, command, executable code and/or application. In the present embodiment, the user interface unit 240 receives notification message data from the print server 110 based on user credentials received from a print job. This invokes the custom interface unit 220 that invokes the connection check unit 222 to check the connection status of the client device 120 and the print server 110 over the network 100. Upon confirmation of connection, the print server 110 sends notification message data to the user interface unit 240 invoking the custom interface unit 220 to display a graphical interface message to the user of the client device 120.

The connection check unit 222 can be, but is not limited to, any device, function, command, executable code and/or application, or combination thereof, that allows the print server 110 to check the connection of the client device 120 over the network 100. In general, the connection check unit 222 sends a short data burst acknowledging data delivery over the network 110 back to a requesting device. This is similar to an echo function. In the present embodiment, the custom interface unit 222 invokes the connection check unit 222 to acknowledge the successful receipt of notification message data sent from the print server 110 based on user credentials received from a print job.

The user display unit 224 can be, but is not limited to, any device, function, command, executable code and/or application, or combination thereof, that allows the client device 120 to graphically display a visual message. In general, the user display unit 224 displays a visual message box to the user of the client device 120 prompting for user input. In the present embodiment, the custom interface unit 222 invokes the user display unit 224 after receiving message notification data from the print server 110 requesting input from the client device 120 user. This occurs subsequent to invoking the connection check unit 222 confirming connection between the client device 120 and print server 110. In another embodiment, the user display unit 224 prompts the client device 120 user for credentials that are subsequently verified by the print server 110 for printing.

Figure 3:
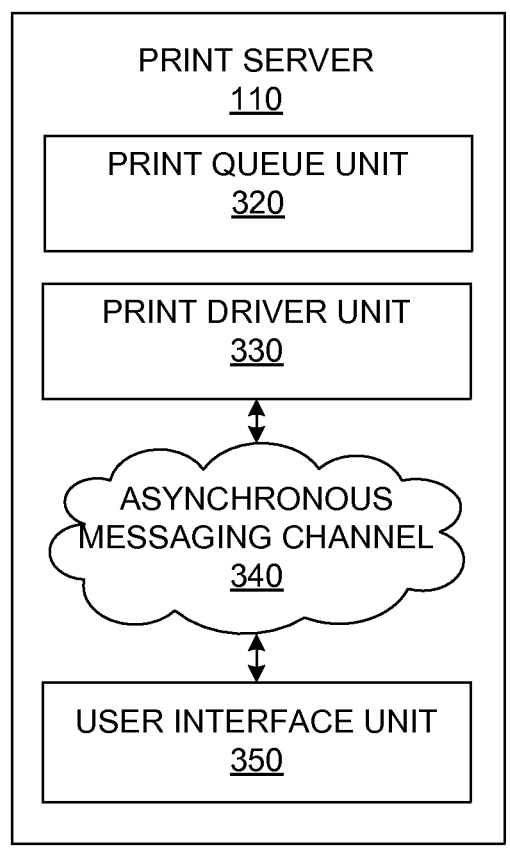
FIG. 3 is a block diagram of a print server configured to print upon client user input according to an exemplary embodiment of the present invention.

FIG. 3 is a block diagram of a print server 110 configured to print upon client device 120 user input according to the present embodiment. The print server 110 includes, but is not limited to, a print queue unit 320, a print driver unit 330, asynchronous messaging channel 340 and a user interface unit 350.

The print queue unit 320 can be any device and/or program, or combination thereof, which has the ability to send, receive, and store print data. Generally, the print queue unit 320 manages print jobs sent by client devices 120 over the network 100 for printing. Moreover, the print queue unit 320 is responsible for receiving document print data from the client device 120 when a user initiates document printing to a network-connected printer managed by the print server 110.

The asynchronous messaging channel 340 can be any device and/or program, or combination thereof, which allows the bi-directional communication of information amongst participants without requiring concurrent availability of the participants. Typically, the asynchronous messaging channel 340 is a component of the operating system on the print server 110 and allows a print driver unit 330 to provide asynchronous event notification messages to necessary recipients. In the present embodiment, the operating system is Microsoft™ Windows Vista™ and the print driver unit 330 invokes the asynchronous messaging channel 340 which is the Microsoft™ AsyncUI interface to communicate with the user interface unit 250 which is Microsoft™ Windows Explorer™, based on print job credentials received from the client device 120. While the present embodiment is described with respect to the Microsoft™ Windows environment, the present invention is applicable to any other operating system environment.

The printer driver unit 330 can be any device and/or program, or combination thereof, which allows the print server 110 to properly control and operate a printer. Generally, the print driver unit 330 allows the print server 110 to manage print data received from client devices 120 over the network 100 and provide the necessary commands for printing. In the present embodiment, the print driver unit 330 receives print data and job identification data from the client device 120 and requires information from the client device 120 user to begin printing. As a result, the print driver unit 330 invokes the asynchronous messaging channel 340 to communicate with the user interface unit 350 to send a notification message checking the status of the client device 120. The notification message is sent using the job identification data received from print job data. If connection confirmation is received back from the client device 120, then the print driver unit 330 generates a notification message to prompt the user of the client device 120 to input information. In yet another embodiment of the invention, the user input requested from the client device 120 user is the user's credentials.

The user interface unit 350 can be any device and/or program, or combination thereof, which allows viewing and management of files, folders, and/or drives on a server device. In general, the user interface unit 350 is associated with the operating system of a device and it presents a user with a graphical interface to control the device. In the present embodiment, the user interface unit 350 is Microsoft™ Windows Explorer™ and it 110 communicates with the user interface unit 240 of the client device 120 over the network 100. While the present embodiment is described with respect to the Microsoft™ Windows Explorer™, any other implementation of the user interface unit 350 that would enable practice of the present invention is applicable.

Figure 4:
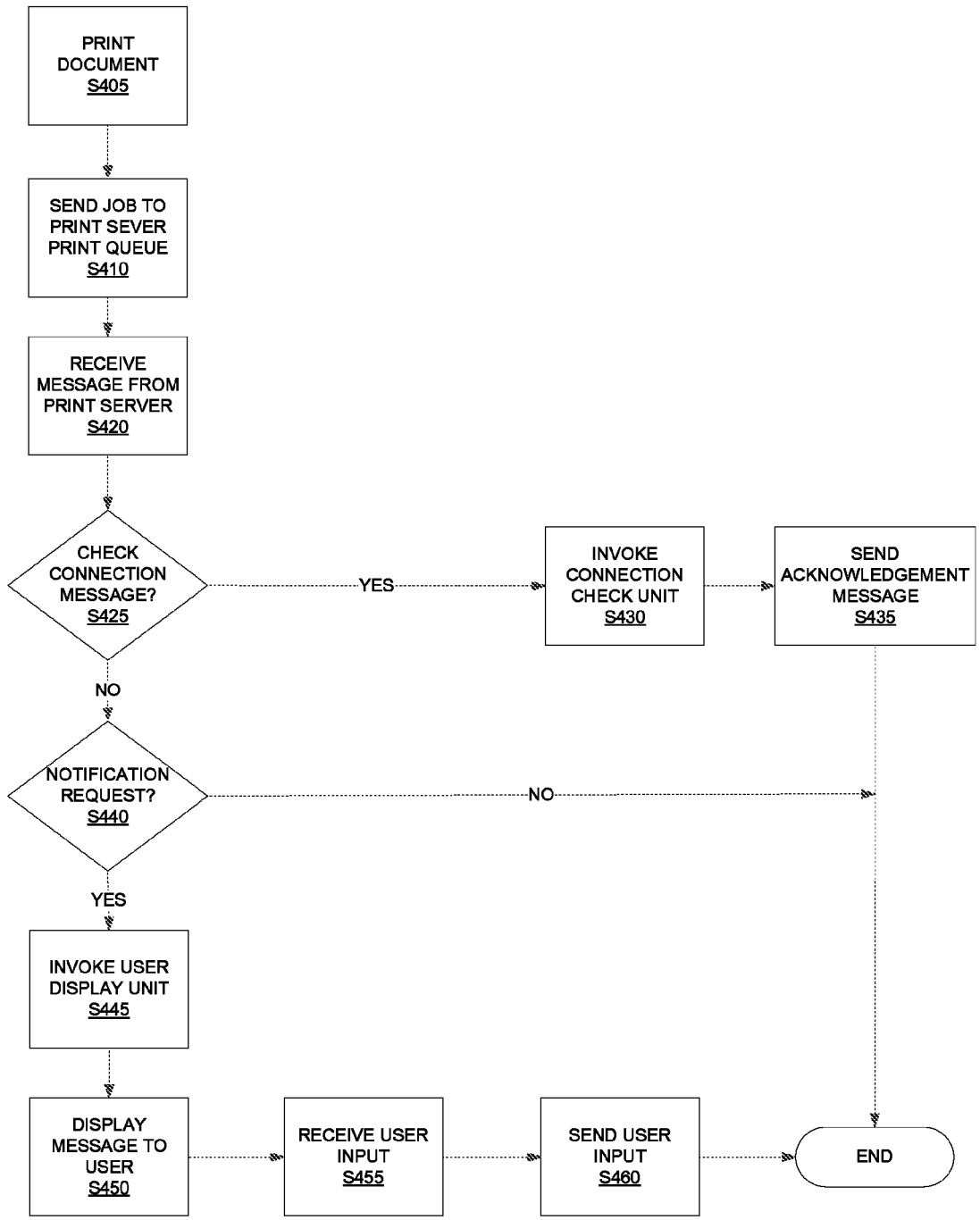
FIG. 4 is a flow diagram illustrating a client device printing a document according to an exemplary embodiment of the present invention.

FIG. 4 is a flow diagram illustrating a client device 120 printing a document according to the present embodiment. Generally, the process begins with a user of the client device 120 printing a document through use of a printing application (step S405). Afterwards, the print job is sent to the print queue unit 320 on the print server 110 over the network 100 (step S410). Next, the user interface unit 240 of the client device 120 receives a message from the print server 110 over the network 100 (step S420). The received message is checked, and a determination is made at the user interface unit 240 whether the message is a check connection message (step S425).

If the message is a check connection message, flow proceeds with the user interface unit 240 invoking the custom user interface unit 220 to invoke the connection check unit 222 (step S430). As a result, the connection check unit 222 sends a short data burst acknowledging execution and receipt of the message to the print server 110 over the network 100 (step S435). The process then ends.

If the message received is not a check connection message, then flow continues by checking whether the message is a notification request message requesting the user to input needed information (step S440). If the message is not a notification request, the process ends. If the message is a notification request, the user interface unit 240 invokes the custom user interface 220 to invoke the user display unit 224 (step S445). This results in a display of a message to the client device 120 user prompting for input of information (step S450). Next, the client device 120 receives S455 the user input and sends S460 the received input information to the print server 110 over the network 100.

Figure 5:
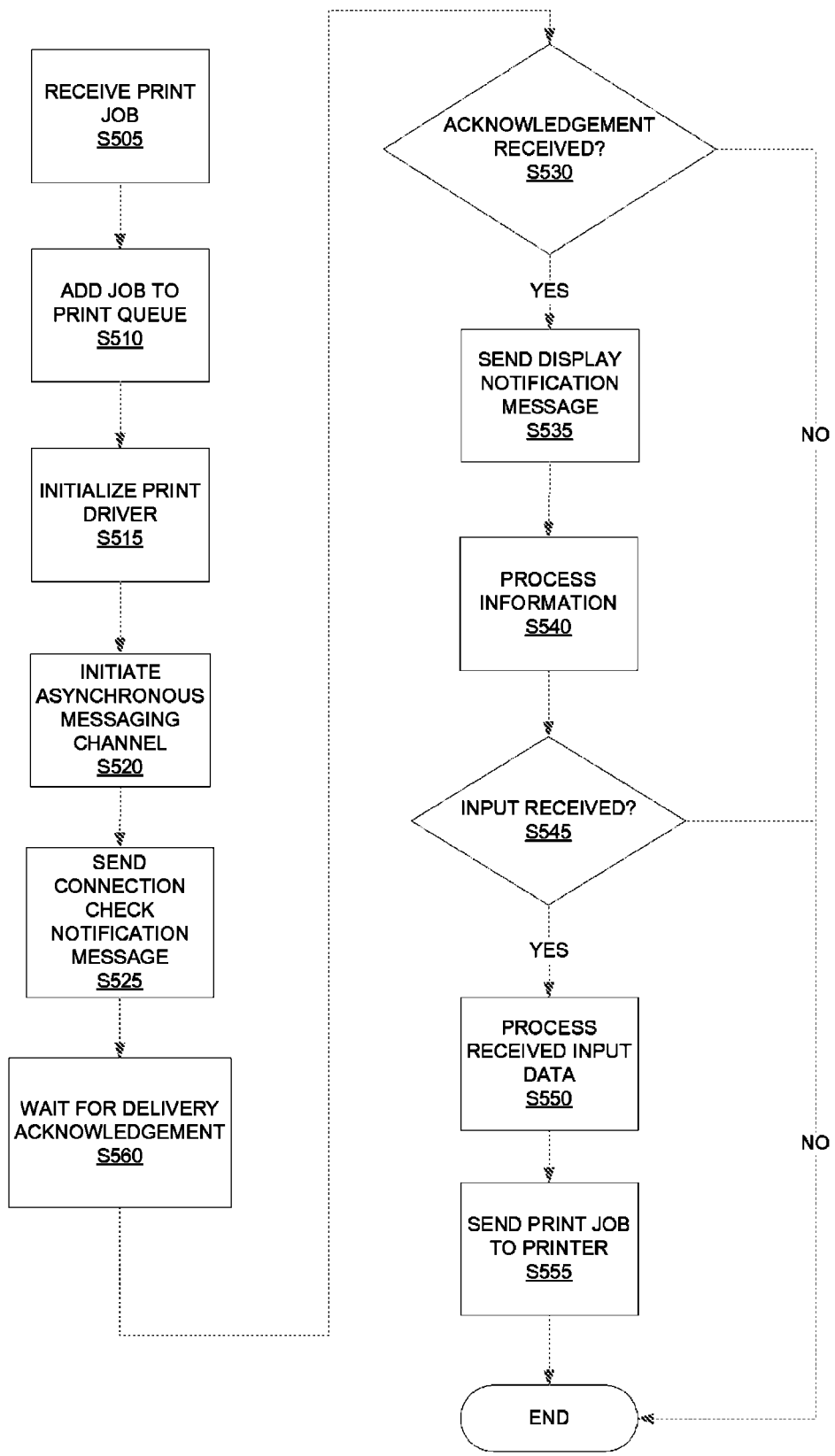
FIG. 5 illustrates a flow diagram of a print server configured to check connection status with the client device and request client user input for printing according to an exemplary embodiment of the present invention.

FIG. 5 illustrates a flow diagram of a print server 110 configured to check connection status with the client device 120 and request client user input for printing, according to the present embodiment. In general, the process begins with the print server 110 receiving a print job from the client device 120 over the network 100 (step S505). After receiving the print job, the job is added to the print queue unit 320 where it waits to be processed (step S510). Next, the print driver unit 330 is initialized by the print server 110 to prepare the print data for printing (step S515). Accordingly, the print driver unit 330 initiates the asynchronous messaging channel 340 to allow communication between the print driver unit 330 and user interface unit 350. After the asynchronous messaging channel 340 is initiated (step S520), the print driver unit 330 sends a connection check notification message to the user interface unit 350 which sends the notification message to the user interface unit 240 on the client device 120 over the network 100 (step S525). The check connection notification message invokes the custom user interface unit 220 to execute the connection check unit 220.

Once the connection check notification message has been sent, the print server 110 waits for the receipt of delivery acknowledgement data from the client device 120 (step S560). If no acknowledgment data is received (step S530), the print job is cancelled and the process ends. In the present embodiment, the wait time is defined and a print job is cancelled if the delivery acknowledgment is not received within the defined time.

If acknowledgement data is received (step S530), then flow continues with the print driver unit 330 sending a display notification message to the client device 120 to display a message to the user via the asynchronous messaging channel 340 (step S535). The message includes a request for the user to input data needed at the print server 110 for printing which invokes the custom user interface unit 220 at the client device 120 to invoke the user display unit 224.

After sending the display notification message, the print server 110 waits for the receipt of input data from the client device 120 user over the network 100 (step S545). In the present embodiment, the input from the user is credentials to identify the user for accounting purposes. However, any other type of data that would enable practice of the present invention is applicable.

If user input is not received (step S545), then the print job is cancelled and the process ends. If user input is received, the print server 110 processes S550 the received input data to begin printing. As a result, the print job in the print queue unit 320 is processed and sent S555 to a printer.

The function according to the present embodiment described in FIGS. 1-5 may be achieved by a host computer that executes an externally installed program. In such a case, the program and the associated data may be supplied to the host computer using a storage medium including, but not limited to, an optical disc, a flash memory, a floppy disc, or an external storage medium via a network or direct connection.

In this way, the storage medium stores the software program code that achieves the functions of the above-described exemplary embodiments. The storage medium is supplied to a system or an apparatus. The present invention can be achieved by causing a computer (central processing unit (CPU) or micro-processing unit (MPU)) of a system or apparatus to read and execute the software program code.

In such a case, the program code itself read out of the storage medium realizes the functions of the above-described embodiments. Therefore, the storage medium storing the program code can also realize the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for printing over a network, the method comprising:
    adding a print job to a print queue at a server device different from a printer;
    initializing an asynchronous communication channel;
    sending notification message data, based on user session data, from the server device to a client device over a network via the asynchronous communication channel;
    receiving delivery confirmation data at the server device, from the client device, in response to delivery of the notification message data;
    requesting, based on job identification data of the print job in the print queue, user input data which indicates credentials to identify a user from the client device via the asynchronous communication channel;
    cancelling the print job when the user input data is not received from the client device in response to the request via the asynchronous communication channel; and
    sending the print job with the user input data to the printer for a printing when the user input data is received from the client device in response to the request via the asynchronous communication channel,
    wherein the user input data is processed to begin printing based on the print job by a printer driver at the server device and used for accounting.

2. The method of claim 1, wherein the asynchronous communication channel is initialized by the print driver at the server device.

3. The method of claim 1, wherein the asynchronous communication channel is the AsyncUI interface by the Microsoft™ Corporation.

4. The method of claim 1, wherein a timeout period is set to receive the delivery confirmation data.

5. The method of claim 1, wherein the user input data is requested via a visual dialog box displayed to the user at the client device.

6. A server device, comprising:
    an adding unit configured to add a print job to a print queue different from a printer;

an initializing unit configured to initialize an asynchronous communication channel;

a sending unit configured to send notification message data, based on user session data, to a client device over a network via the asynchronous communication channel;

a receiving unit configured to receive delivery confirmation data from the client device, in response to delivery of the notification message data;

a requesting unit configured to request, based on job identification data of the print job in the print queue, user input data which indicates credentials to identify a user from the client device via the asynchronous communication channel;

a cancelling unit configured to cancel the print job when the user input data is not received from the client device in response to the request via the asynchronous communication channel; and a sending unit configured to send the print job with the user input data to the printer for a printing when the user input data is received from the client device in response to the request via the asynchronous communication channel, wherein the user input data is processed to begin printing based on the print job by a printer driver and used for accounting.

7. The device of claim 6, wherein a timeout period is set to receive the delivery confirmation data.

8. The device of claim 6, wherein the user input data is requested via a visual dialog box displayed to the user at the client device.

9. A non-transitory computer-readable storage medium storing a control program for causing a computer to execute a method, the method comprising:

adding a print job to a print queue at a server device different from a printer;

initializing an asynchronous communication channel;

sending notification message data, based on user session data, from the server device to a client device over a network via the asynchronous communication channel;

receiving delivery confirmation data at the server device, from the client device, in response to delivery of the notification message data;

requesting, based on job identification data of the print job in the print queue, user input data which indicates credentials to identify a user from the client device via the asynchronous communication channel;

cancelling the print job when the user input data is not received from the client device in response to the request via the asynchronous communication channel; and sending the print job with the user input data to the printer for a printing when the user input data is received from the client device in response to the request via the asynchronous communication channel, wherein the user input data is processed to begin printing based on the print job by a printer driver at the server device and used for accounting.

* * * * *